US010582016B2

(12) United States Patent
Dhanawade

(10) Patent No.: US 10,582,016 B2
(45) Date of Patent: Mar. 3, 2020

(54) FIRST DEVICE WITH AN EMBEDDED GATEWAY TO SUPPORT A SECOND COMMUNICATIONS PROTOCOL

(71) Applicant: INTELLIGENT PLATFORMS, LLC, Charlottesville, VA (US)

(72) Inventor: Mohan Marutirao Dhanawade, Hyderabad (IN)

(73) Assignee: INTELLIGENT PLATFORMS, LLC, Charlottesville, VA (US)

( * ) Notice: Subject to any disclaimer, the term of this patent is extended or adjusted under 35 U.S.C. 154(b) by 389 days.

(21) Appl. No.: 15/331,003

(22) Filed: Oct. 21, 2016

(65) Prior Publication Data

US 2018/0115633 A1 Apr. 26, 2018

(51) Int. Cl.
*H04L 29/06* (2006.01)
*H04L 29/08* (2006.01)
(Continued)

(52) U.S. Cl.
CPC .............. *H04L 69/08* (2013.01); *H04L 12/00* (2013.01); *H04L 12/40169* (2013.01);
(Continued)

(58) Field of Classification Search
CPC ... H04L 29/06; H04L 51/066; H04L 67/2823; H04L 69/08; H04L 12/2836; H04L 69/18;
(Continued)

(56) References Cited

U.S. PATENT DOCUMENTS 7,058,712 B1 * 6/2006 Vasko ................ G05B 19/0421 709/224
7,606,890 B1 * 10/2009 Baier ................ G05B 19/4185 709/217

(Continued)

FOREIGN PATENT DOCUMENTS

IN 201100131 I4 10/2012

OTHER PUBLICATIONS

Chen, et al., "Open architecture design of embedded controller for industrial communication gateway", ICIC Express Letters, Part B: Applications, v 1, n 1, p. 51-56, 2010.

(Continued)

*Primary Examiner* — David R Lazaro
(74) *Attorney, Agent, or Firm* — Marshall, Gerstein & Borun LLP

(57) ABSTRACT

An industrial control system and a method of controlling an industrial control system having two communications protocols is described. The method comprises sending, by a controller, communications over a first communications network to a first device, the communications intended to control the first device and a second device, the communications transmitted to the first device from the controller in a first communications protocol; translating, by the first device, the communications from the controller in the first communications protocol intended for the second device into a second communications protocol; and transmitting, by the first device, the translated communications to the second device over a second communications network using the (Continued)

Sending, By A Controller, Communications Over A First Communications Network To A First Device, The First Device Is Used To Control Or Monitor One Or More First Processes In An Industrial System, The Communications Are Intended To Control The First Device And A Second Device And The Communications Are Transmitted To The First Device From The Controller In A First Communications Protocol
302

Translating, By The First Device, The Communications From The Controller In The First Communications Protocol Intended For The Second Device Into A Second Communications Protocol
304

Transmitting The Translated Communications From The First Device To The Device Ove A Second Communications Network Using The Second Communications Protocol, Wherein The Second Device Is Used To Control Or Monitor One Or More Second Processes In The Industrial System.
306

Sending, By The Second Device, Information To The First Device Using The Second Communications Protocol And The First Device Translating The Information Into The First Protocol And Sending The Information To The Controller Over The First Communications Network Using The First Communications Protocol
308

Configuring, Using A Single Configuration Tool, The Controller For Communication With The First Device And The Second Device And Configuring The First Device For Translation Of Communications Between The Controller And The Second Device
310 second communications protocol, wherein the first device is used to control or monitor one or more first processes in an industrial system and the second device is used to control or monitor one or more second processes in the industrial system.

20 Claims, 5 Drawing Sheets

(51) Int. Cl.
*H04L 12/00* (2006.01)
*H04L 12/40* (2006.01)
*H04L 12/66* (2006.01)

(52) U.S. Cl.
CPC .............. *H04L 67/12* (2013.01); *H04L 69/18* (2013.01); *H04L 12/66* (2013.01); *H04L 2012/4026* (2013.01)

(58) Field of Classification Search
CPC ....... H04L 67/12; H04L 12/66; H04L 67/125; H04W 4/38; H04W 4/70
See application file for complete search history.

(56) References Cited

U.S. PATENT DOCUMENTS

| | | | | |
|---|---|---|---|---|
| 7,836,168 | B1 * | 11/2010 | Vasko | G05B 19/0421 709/224 |
| 8,510,463 | B2 | 8/2013 | Pettigrew et al. | |
| 9,210,534 | B1 * | 12/2015 | Matthieu | H04W 4/02 |
| 2007/0019641 | A1 | 1/2007 | Pai et al. | |
| 2007/0186010 | A1 * | 8/2007 | Hall | H04L 12/4625 709/246 |
| 2016/0072670 | A1 * | 3/2016 | Matthieu | H04L 67/12 709/204 |
| 2016/0150057 | A1 * | 5/2016 | Men | H04W 4/70 709/230 |
| 2016/0182446 | A1 * | 6/2016 | Kong | H04L 69/08 |

OTHER PUBLICATIONS

Guo, et al., "A reconfigurable intelligent gateway for heterogeneous networks", Lecture Notes in Electrical Engineering, v 254 LNEE, p. 485-493, 2013.

* cited by examiner

FIRST DEVICE WITH AN EMBEDDED GATEWAY TO SUPPORT A SECOND COMMUNICATIONS PROTOCOL

TECHNICAL FIELD

Aspects of the disclosure relate generally to an industrial automation and, in particular, an industrial control system comprised of at least two communications protocols.

BACKGROUND

Generally, sensor-based industrial control systems (ICS) comprise sensors that measure and/or monitor various parameters (e.g., temperature, flow rate, valve position, voltage, current, etc.) of a process. The sensors receive and/or provide signals to an input/output device, which is in communication with one or more processors (i.e., controllers) over a communications network. In some instances, it may be desirable to have some of the sensors on the communications network communicate with the controller using a first protocol, while other sensors communicate with the controller using a second communications protocol. In the past, this has been accomplished using dedicated gateway devices that translate communications in the second protocol into communications with the first protocol, and vice-versa, so that communications may occur between devices configured for the second communications protocol and the controller. However, this arrangement adds additional devices (e.g., gateways) to the communications network, which may be points for failure and/or error. This arrangement also requires multiple configuration tools to configure the gateways and the devices, which require additional time and resources for programming.

Therefore, systems and methods are desired that overcome challenges in the art, some of which are described above.

SUMMARY

Disclosed herein is a system and a method for controlling an industrial control system having at least two communications protocols, without the use of a separate gateway device.

In one aspect, an industrial control system is disclosed. Embodiments of the system comprise a controller; a first communications network connected to the controller; a first device connected to the first communications network and a second communications network, wherein the first device communicates with the controller over the first communications network using a first communications protocol and the first device is used to control or monitor one or more first processes in an industrial system; and a second device connected to the second network, wherein the second device communicates with the first device over the second communications network using a second communications protocol and the second device is used to control or monitor one or more second processes in the industrial system, wherein the first device receives communications from the controller over the first communications network, the communications intended to control the first device and the second device, the communications transmitted to the first device from the controller in the first communications protocol, wherein the first device translates the communications from the controller in the first communications protocol intended for the second device into the second communications protocol and transmits the translated communications to the second device over the second communications network using the second communications protocol.

Alternatively or optionally, the second device sends information to the first device using the second communications protocol and the first device translates the information into the first protocol and sends the information to the controller over the first communications network using the first communications protocol.

Alternatively or optionally, the first communications protocol may comprise ProfiNet and the first device may comprise a ProfiNet device.

Alternatively or optionally, the controller may comprise a ProfiNet controller.

Alternatively or optionally, the second communications protocol may comprise Modbus.

Alternatively or optionally, the second device may comprise a Modbus device. For example, the second device may comprise one of a Modbus RTU, a Modbus gateway, a Modbus flow meter and the like.

Alternatively or optionally, the first communications network and the second communications network comprise industrial Ethernet networks.

Alternatively or optionally, an embodiment of the system may further comprise a configuration tool, wherein the configuration tool is used to configure the controller for communication with the first device and the second device and is used to configure the first device for translation of communications between the controller and the second device.

Also disclosed herein are embodiments of a method of controlling an industrial control system having two communications protocols. One embodiment of the method comprises sending, by a controller, communications over a first communications network to a first device, the communications intended to control the first device and a second device, the communications transmitted to the first device from the controller in a first communications protocol; translating, by the first device, the communications from the controller in the first communications protocol intended for the second device into a second communications protocol; and transmitting, by the first device, the translated communications to the second device over a second communications network using the second communications protocol, wherein the first device is used to control or monitor one or more first processes in an industrial system and the second device is used to control or monitor one or more second processes in the industrial system.

Alternatively or optionally, one embodiment of the method may further comprise the second device sending information to the first device using the second communications protocol and the first device translating the information into the first protocol and sending the information to the controller over the first communications network using the first communications protocol.

Alternatively or optionally, in one embodiment of the method the first communications protocol may comprise ProfiNet and the first device may comprise a ProfiNet device.

Alternatively or optionally, in one embodiment of the method the controller may comprise a ProfiNet controller.

Alternatively or optionally, in one embodiment of the method the second communications protocol may comprise Modbus and the second device may comprise a Modbus device. For example, the second device may comprise one of a Modbus RTU, a Modbus gateway, a Modbus flow meter and the like.

Alternatively or optionally, in one embodiment of the method the first communications network and the second communications network may comprise industrial Ethernet networks.

Alternatively or optionally, one embodiment of the method may further comprising configuring, using a configuration tool, the controller for communication with the first device and the second device and configuring the first device for translation of communications between the controller and the second device.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1A:
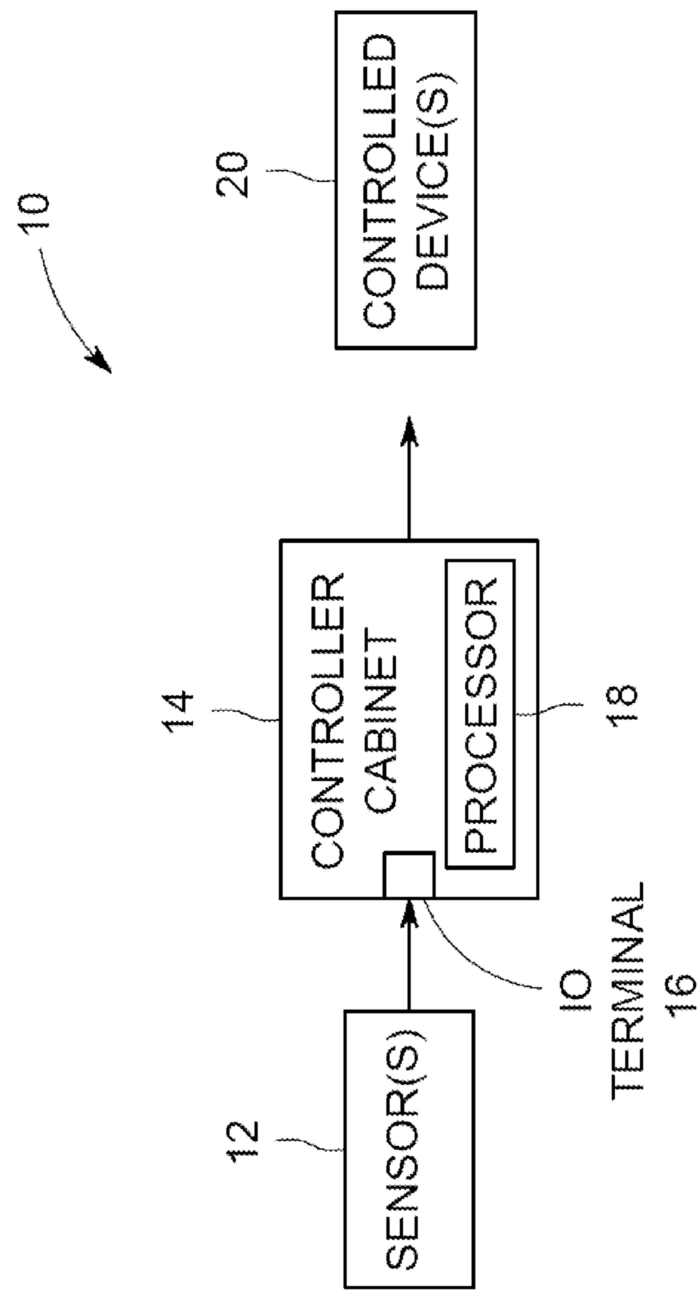
FIG. 1A is an overview illustration of a basic sensor-controlled control system.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices. Furthermore, all or portions of aspects of the disclosed can be implemented using cloud-based processing and storage systems and capabilities. One such non-limiting example of a cloud-base service that can be used in implementations of the disclosed is GE Predix™, as available from the General Electric Company (Schenectady, N.Y.). Predix™ is a cloud-based PaaS (platform as a service) that enables industrial-scale analytics for asset performance management (APM) and operations optimization by providing a standard way to connect machines, data, and people.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1A is an overview illustration of a very basic sensor-controlled control system 10. In some embodiments, the sensor-controlled system 10 may be a power management system in a power plant or other suitable systems. In certain embodiments, the sensor-controlled system 10 includes one or more sensors 12 that couple to a controller cabinet 14 through one or more I/O terminals 16. As used herein, the terms "I/O terminals," "I/O devices," "I/O modules" and "I/O packs" are used interchangeably. In certain embodiments, the one or more sensors 12 may detect temperatures (e.g., thermocouples, resistor temperature detectors (RTDs)), electrical properties (e.g., current, voltage) of certain signals, or other suitable properties and may transmit sensed information to a respective 10 terminal 16 in one of a variety of formats. For example, various embodiments of the terminals 16 may receive information from various types of sensors 12 that send information using various voltages, such as 2.5 to 5V, −10V to 10 V, 30 mV to 10V, −100 mV to 100 mV, or other suitable voltages. Additionally, or alternatively, some embodiments of the I/O terminals 16 may receive signals from the sensors 12 using a variety of currents such as 4-20 mA, 10 mA, or other suitable currents. Additionally, certain embodiments of the sensors 12 may transmit using a highway addressable remote transducer (HART) protocol or other similar protocols.

In some embodiments, the controller cabinet 14 may be housed in a single physical enclosure (e.g., a personal computer, server, or other suitable controller system) or may include multiple enclosures (e.g., distributed control system). In each of the various embodiments, the one or more I/O terminals 16 provide a connection between the one or more sensors 12 and the controller cabinet 14. As discussed in detail below, the one or more I/O terminals 16 provide a link between the sensor 16 and a processor 18. In some embodiments, the processor 18 may include a microcontroller, a microprocessor, a programmable logic controller (PLC), or another suitable processor. Accordingly, through the one or more I/O terminals 16, the processor 18 may receive signals from the one or more sensors 12 that sense various measurements within the sensor-controlled system 10. Additionally, the one or more I/O terminals 16 may be grouped in channels to receive sensed parameters from the one or more sensors 12 through more than one I/O terminal. Furthermore, one or more of the I/O terminals 16 in a channel may be used to return information to one or more sensors 12. For example, in some embodiments, a sensor 12 (e.g., RTD) may be connected to the controller cabinet 14 through one, two, three, four, or more I/O terminals 16. For example, in certain embodiments, one channel may encompass 2 I/O terminals 16, but other embodiments may include channels encompassing three, four, or more I/O terminals 16. Moreover, in some embodiments each sensor 12 may connect to a single channel, but other embodiments may include sensors 12 that span two or more channels.

In various embodiments, once the processor 18 has received a sensed parameter (e.g., temperature) from the one or more sensors 12, the processor 18 may use this sensed parameter to control one or more controlled devices 20 and/or select a sensor type for the connected sensor 12. Within the sensor-controlled system 10, the controlled devices 20 may include any device that depends upon or creates the measurements from the one or more sensors 12. For example, in certain embodiments, the controlled devices 20 may include one or more devices within a power plant (e.g., compressor, combustor, turbine, etc.).

Figure 1B:
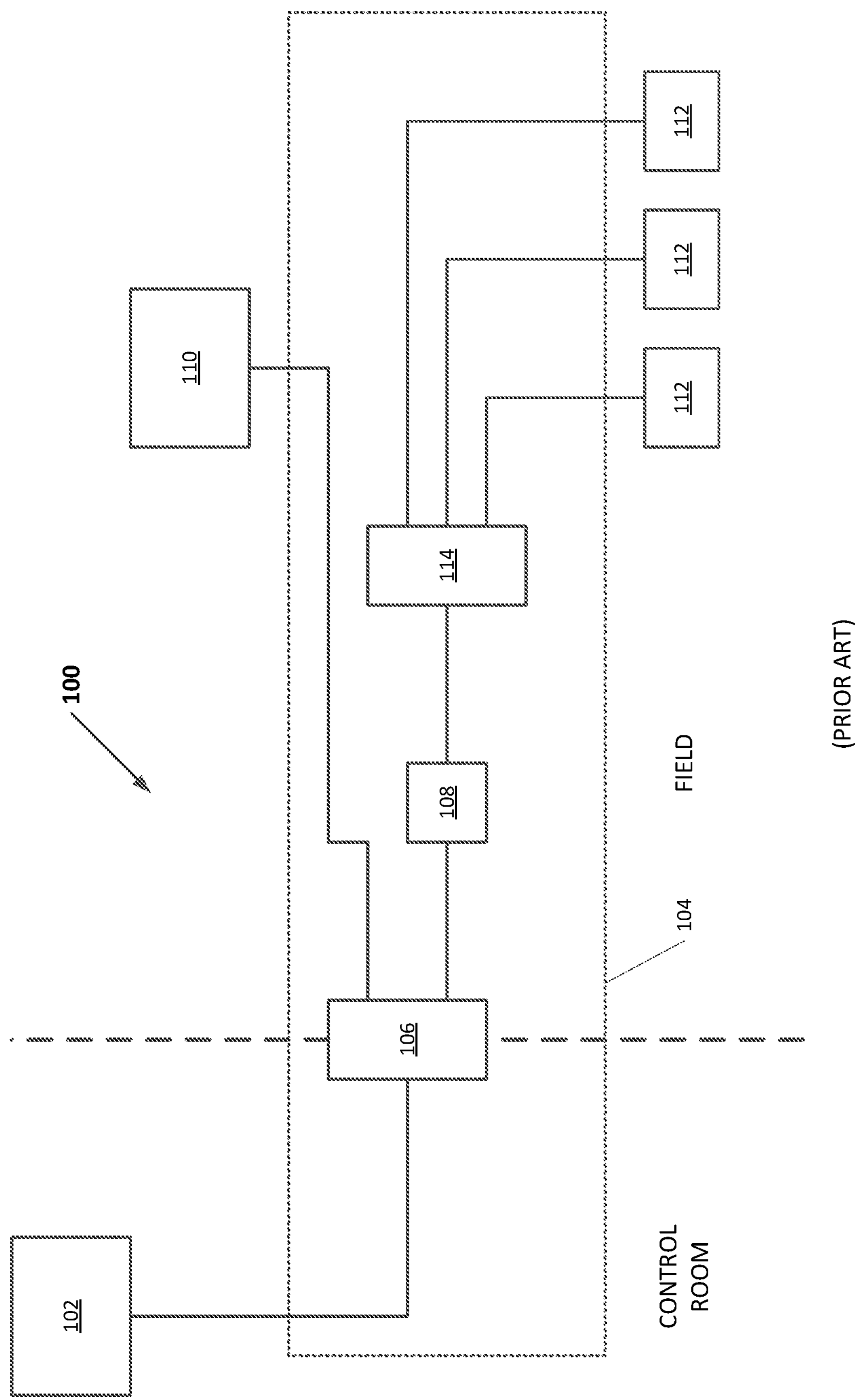
FIG. 1B illustrates an exemplary prior art industrial control system.

FIG. 1B illustrates an exemplary prior art industrial control system 100. This embodiment of a system 100 comprises a controller 102, which will generally be situated in a control room. The controller 102 is connected to a communications network 104. The communications network 104 can be comprised of a number of devices, software and cabling. It may be wired (including fiber optics), wireless, or a combination of wired and wireless. For example, the communications network 104 may comprise an Ethernet network. Further comprising the network 104 is a switch 106. Generally, such a switch 106 may be used to separate the control room from field-installed devices.

The communications network 104 of FIG. 1B may comprise one or more gateway devices 108. A gateway device 108 is used to translate between two different communications protocols that may be used on the communications network 104. For example, a plant may retrofit part of its industrial control system 100 and use a new communications protocol. However, it may device to keep a portion of the plan on a legacy communications protocol. A gateway device 108 enables the new communications protocol to be translated into the old legacy communications protocol. For example, a first communications protocol may be used to communicate over the communications network 104 between the controller and a first device 110. The gateway device 108 enables communications from the controller 102 to one or more second devices 112 to be translated from the first communications protocol to a second communications protocol (e.g., the legacy protocol). Similarly, the gateway device 108 may be bi-directional. Communications from one or more of the second devices 112 can be translated from the second communications protocol to the first communications protocol by the gateway device 108 and then transmitted to the controller 112. Communications with a plurality of second device 112 can occur through the use of one or more additional switches 114, if needed. In one non-limiting example, the first communications protocol comprises the ProfiNet protocol. ProfiNet is the Ethernet-based automation standard of PROFIBUS International (formerly PROFIBUS Nutzerorganisation e.V.), which defines a cross-vendor communication, automation and engineering model. The ProfiNet standard, including all past standard and any future-developed standard is incorporated by reference. Additional information about the ProfiNet standard can be found at www.profibus.com.

A disadvantage to the prior art system shown in FIG. 1B is the requirement to have one or more gateway devices 108 in the communications network 104. For each communication protocol used in the communication network, a separate gateway device is required to translate communications to the communication protocol being used by the controller 102. For each gateway device 108/communications protocol, a separate configuration tool is also required. Configuration of IO hardware device with IO slots in development workspace is often a labor-intensive and complex process. A given IO hardware device may be compatible with tens to several hundreds of different IO module types, which may have submodules for further customization. Although general station description (GSD) in XML format (GSDML) files provide libraries of hardware descriptions for a given class of development workspaces, these files are massive having thousands to tens of thousands of entries. In addition, there is no standard nomenclature among manufacturers and vendors for common hardware IO features nor are there standardized nomenclatures to describe proprietary hardware configurations. In addition, searching functions are limited to string and Boolean searches of the hard-coded description in the GSDML file. For these classes of development workspaces, GSDML and hardware XML files are imported and made available to the user independent of the programming and configuring of the programming of the IO hardware. In these classes of development workspaces, a separate search window is often employed.

Figure 2:
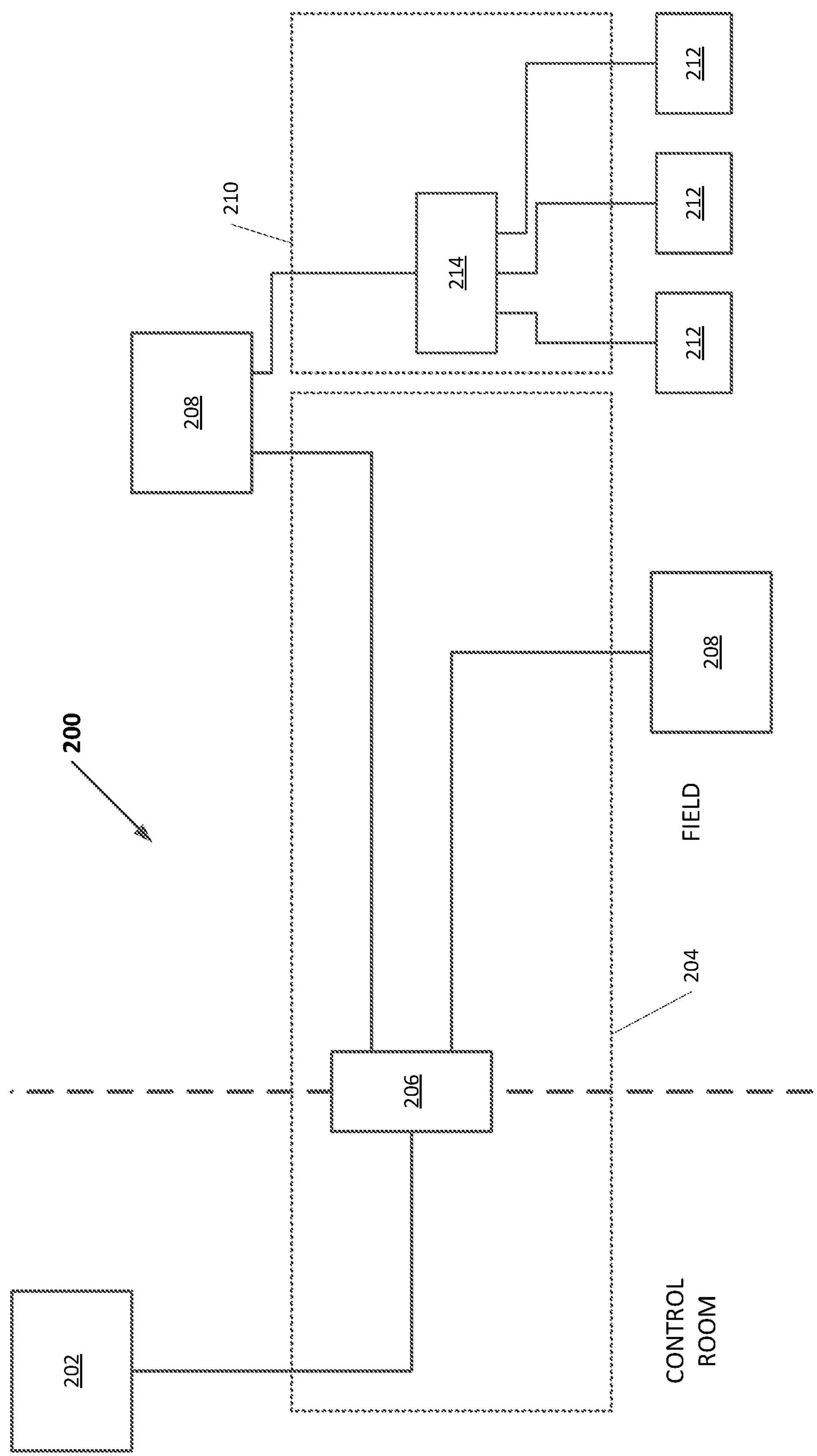
FIG. 2 shows an exemplary industrial control system in accordance with some embodiments of the disclosure.

FIG. 2 shows an exemplary industrial control system 202 in accordance with some embodiments of the disclosure. As shown in FIG. 2, a controller 401 is connected to a first communications network 204. The first communications network 204 can be comprised of a number of devices, software and cabling. It may be wired (including fiber optics), wireless, or a combination of wired and wireless. For example, the first communications network 204 may comprise a switched Ethernet network. Further comprising the first communications network 204 may be a switch 206. Generally, such a switch 206 may be used to separate the control room, where the controller is located, from field-installed devices.

Further comprising the system 200 of FIG. 2 is at least one first device 208 connected to the first communications network 204. The system 200 of FIG. 2 further comprises a second communications network 210, wherein the first device 208 communicates with the controller 401 over the first communications network 204 using a first communications protocol and the first device 208 is used to control or monitor one or more first processes in an industrial system. The system 200 further comprises at least one second device 212 connected to the second network 210, wherein the second device 212 communicates with the first device 208 over the second communications network 210 using a second communications protocol and the second device 212 is used to control or monitor one or more second processes in the industrial system. The second communications network may further comprise one or more switches 214, as shown in FIG. 2, which enables the first device 208 to communicate with a plurality of second device 212.

In operation, the first device 208 receives communications from the controller 401 over the first communications network 204. The communications are intended to control the first device 208 and at least one second device 212. The communications are transmitted to the first device 208 from the controller 401 in the first communications protocol. The first device 208 translates the communications from the controller 401 in the first communications protocol that are intended for the second device 221 into the second communications protocol and transmits the translated communications to the second device 212 over the second communications network 210 using the second communications protocol. Similarly, the second device 212 sends information to the first device 208 using the second communications protocol and the first device 208 translates the information into the first protocol and sends the information to the controller 401 over the first communications network 204 using the first communications protocol. In one non-limiting example, the first communications protocol comprises the ProfiNet protocol, as described above, and the first device 208 comprises a ProfiNet device including, for example, a PAC8000 8515-BI-PN, RSTI-EP STXPNS001, and the like that are available from General Electric Company (Schenectady, N.Y.).

In one non-limiting example, the second communications protocol comprises the Modbus protocol and the second device 212 comprises a Modbus device. Modbus is a serial communication protocol developed by Modicon in 1979 for use with its programmable logic controllers (PLCs). In simple terms, it is a method used for transmitting information over serial lines between electronic devices. All Modbus standards, including all past standards and any future-developed standards are incorporated by reference. Additional information about the Modbus standard can be found at www.modbus.org. For example, the second device 212 may comprise one or more of one of a Modbus RTU, a Modbus gateway or a Modbus flow meter.

In other non-limiting examples, the first communications protocol may comprise Ethernet/IP while Modbus comprises the second communications protocol. In yet another example, the first communications protocol may be ProfiNet while the second communications protocol comprises Ethernet Global Data (EGD) protocol.

In one non-limiting example, the controller 401 may comprise a ProfiNet controller. For example, the controller 401 may be a PACSystems™ RX3i Controller as available from General Electric Company, Schenectady N.Y.

Advantageously, the system 200 shown in FIG. 2 requires only one configuration tool to configure the controller 401 for communication with the first device 208 and the second device 212 and configuring the first device 208 for translation of communications between the controller 401 and the second device 212. Unlike the prior art system 100 shown in FIG. 1, the system 200 shown in FIG. 2 does not require multiple configuration tools for each gateway device 108 and/or communications protocol used in the system 100.

Figure 3:
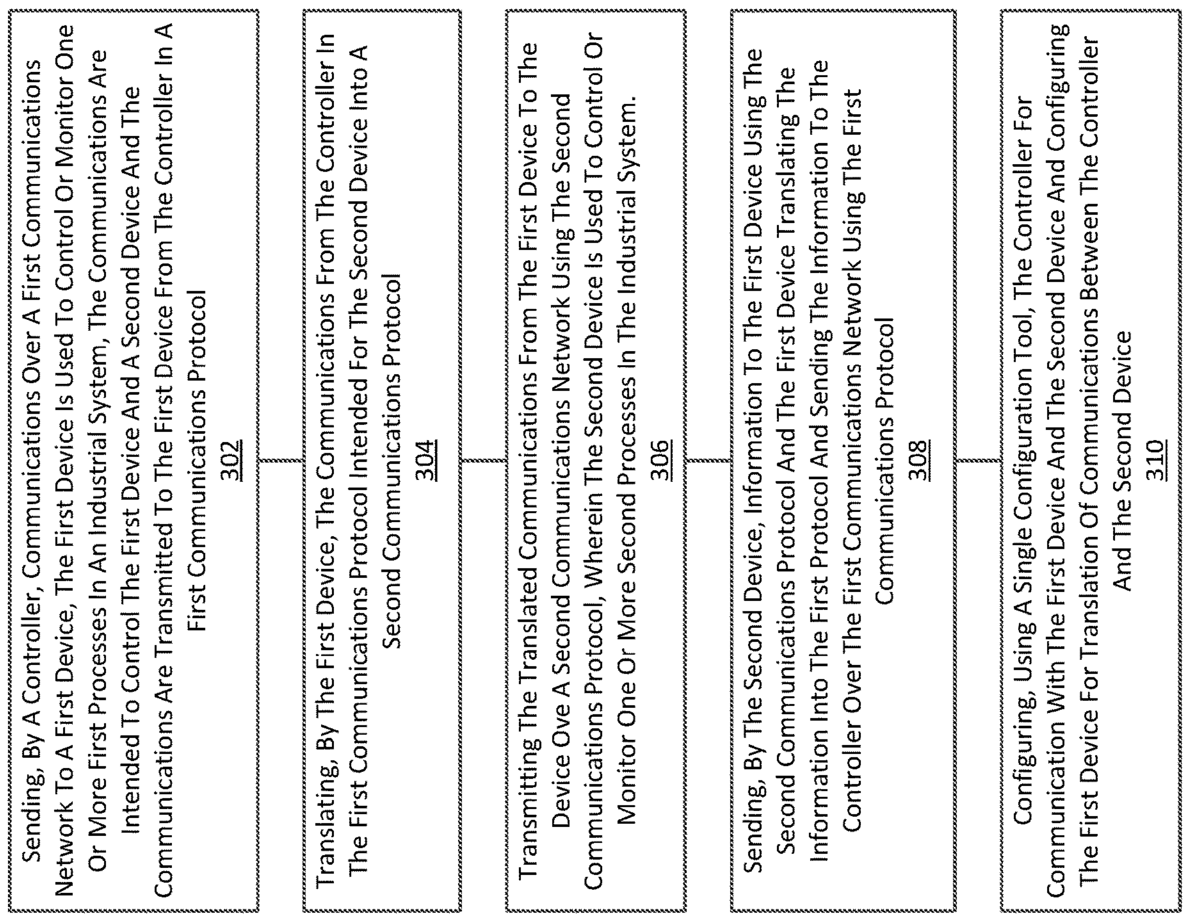
FIG. 3 is a flowchart that describes an exemplary method of controlling an industrial control system having at least two communications protocols.

FIG. 3 is a flowchart that describes an exemplary method of controlling an industrial control system having at least two communications protocols. The method comprises 302 sending, by a controller, communications over a first communications network to a first device. The first device is used to control or monitor one or more first processes in an industrial system. The communications are intended to control the first device and a second device and the communications are transmitted to the first device from the controller in a first communications protocol. The first communications protocol may comprise ProfiNet and the first device may comprise a ProfiNet device. Similarly, the controller may be a ProfiNet controller. At 304, the communications from the controller in the first communications protocol intended for the second device are translated by the first device into a second communications protocol. At 306, the translated communications are transmitted by the first device to the second device over a second communications network using the second communications protocol. The second device is used to control or monitor one or more second processes in the industrial system. The second communications protocol may comprises Modbus and the second device may comprise a Modbus device. For example, the second device may comprise at least one of a Modbus RTU, a Modbus gateway or a Modbus flow meter. The first communications network and the second communications network may comprise industrial Ethernet networks. Alternatively or optionally, the method may further comprise 308, the second device sending information to the first device using the second communications protocol and the first device translating the information into the first protocol and sending the information to the controller over the first communications network using the first communications protocol. The method may also optionally or alternatively further comprise 310, configuring, using a single configuration tool, the controller for communication with the first device and the second device and configuring the first device for translation of communications between the controller and the second device.

Figure 4:
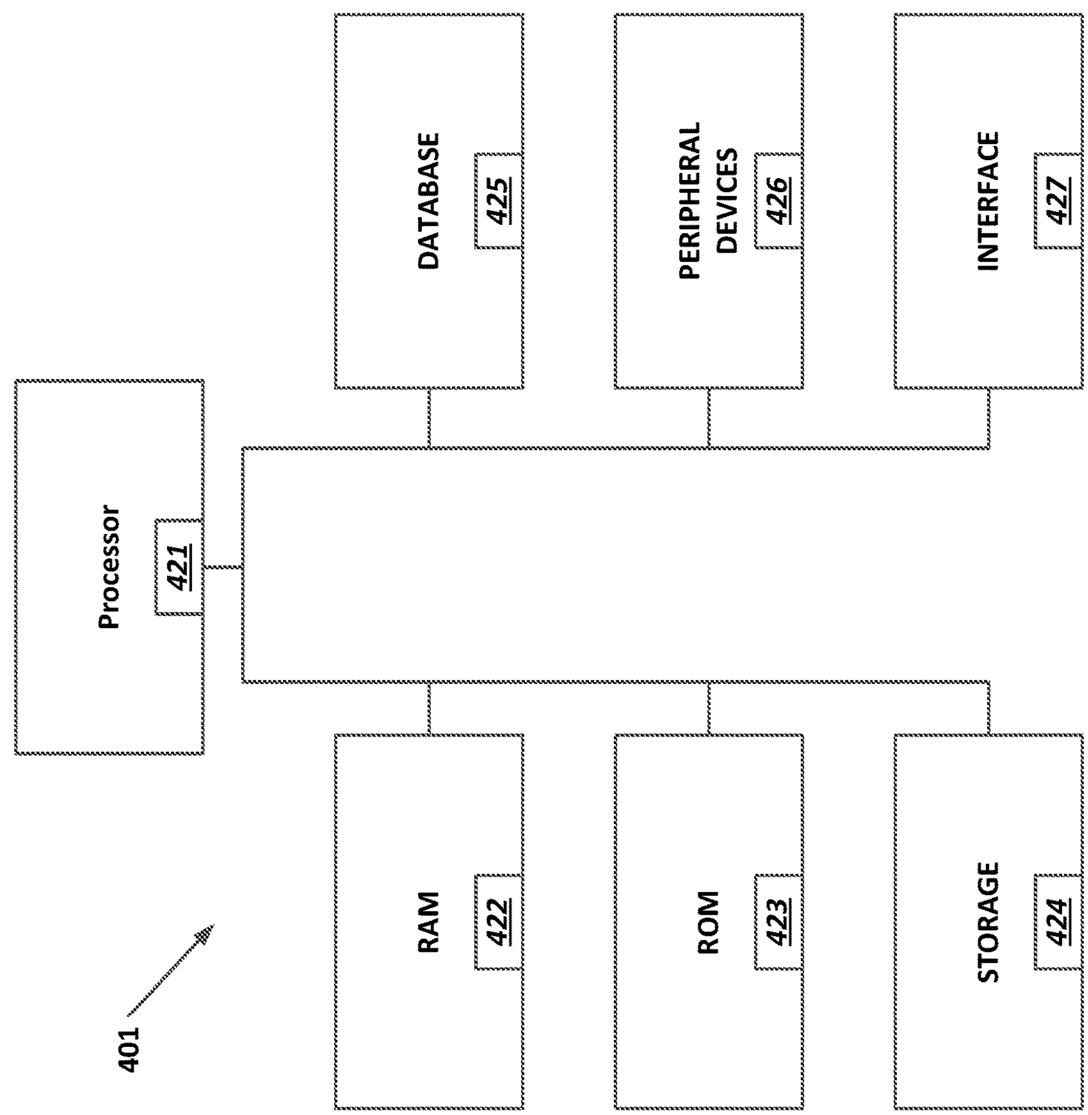
FIG. 4 is a block diagram illustrating an exemplary operating environment for performing the disclosed methods.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise software in combination with hardware to perform a method for facilitating communications of an industrial control system having a plurality of communication protocols as illustrated in FIG. 4 and described below. In one exemplary aspect, the units can comprise a controller 401 or a first device 208 having processing capabilities, as illustrated in FIG. 2, referenced above and described below.

FIG. 4 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise network PCs, minicomputers, mainframe computers, controllers, smartphones, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

FIG. 4 illustrates an exemplary controller 401 that can be used for facilitating communications of an industrial control system having a plurality of communication protocols. In various aspects, the controller 401 of FIG. 4 may comprise all or a portion of the controller 401 of the industrial control system 200 shown in FIG. 2, or it may comprise a portion of the first device 208 of FIG. 2 that is used to translate one communications protocol to another, as described herein. As used herein, "controller" may include a plurality of controllers. The controllers may include one or more hardware components such as, for example, a processor 421, a random access memory (RAM) module 422, a read-only memory (ROM) module 423, a storage 424, a database 425, one or more peripheral devices 426, and an interface 427. Alternatively and/or additionally, controller 401 may include one or more software components such as, for example, a computer-readable medium including computer executable instructions for performing a method associated with the exemplary embodiments. It is contemplated that one or more of the hardware components listed above may be implemented using software. For example, storage 424 may include a software partition associated with one or more other hardware components. It is understood that the components listed above are exemplary only and not intended to be limiting.

Processor 421 may include one or more processors, each configured to execute instructions and process data to perform one or more functions associated with a computer for facilitating the replacement of one or more pre-existing dedicated input/output (I/O) modules and terminal boards with one or more universal I/O modules. Processor 421 may be communicatively coupled to RAM 422, ROM 423, storage 424, database 425, peripheral devices 426, and interface 427. Processor 421 may be configured to execute sequences of computer program instructions to perform various processes. The computer program instructions may be loaded into RAM 422 for execution by processor 421.

RAM 422 and ROM 423 may each include one or more devices for storing information associated with operation of processor 421. For example, ROM 423 may include a memory device configured to access and store information associated with controller 401, including information for identifying, initializing, and monitoring the operation of one or more components and subsystems. RAM 422 may include a memory device for storing data associated with one or more operations of processor 421. For example, ROM 423 may load instructions into RAM 422 for execution by processor 421.

Storage 424 may include any type of mass storage device configured to store information that processor 421 may need to perform processes consistent with the disclosed embodiments. For example, storage 424 may include one or more magnetic and/or optical disk devices, such as hard drives, CD-ROMs, DVD-ROMs, or any other type of mass media device.

Database 425 may include one or more software and/or hardware components that cooperate to store, organize, sort, filter, and/or arrange data used by controller 401 and/or processor 421. For example, database 425 may store data and/or instructions used to translate one communications protocol into another. Additionally and/or optionally, database 425 may store instructions and/or information to perform a method for controlling an industrial control system having two communications protocols, comprising sending, by a controller 202, communications over a first communications network to a first device, the communications intended to control the first device and a second device, the communications transmitted to the first device from the controller 202 in a first communications protocol; translating, by the first device, the communications from the controller 202 in the first communications protocol intended for the second device into a second communications protocol; and transmitting, by the first device, the translated communications to the second device over a second communications network using the second communications protocol, wherein the first device is used to control or monitor one or more first processes in an industrial system and the second device is used to control or monitor one or more second processes in the industrial system. The database 425 may further comprise data and/or instructions used to translate information received by the first device from the second device using the second communications protocol into the first protocol and sending the information to the controller 202 over the first communications network using the first communications protocol. It is contemplated that database 425 may store additional and/or different information than that listed above.

Peripheral devices 426 may include one or more components configured to communicate information with a user associated with controller 401. For example, peripheral devices 426 may include a console with an integrated keyboard and mouse to allow a user to enter information for configuring the controller 202, first device 208, second device 212, and the like using a configuration tool. Peripheral devices 426 may also include a display including a graphical user interface (GUI) for outputting information on a monitor. Peripheral devices 426 may also include devices such as, for example, a printer for printing information associated with controller 401, a user-accessible disk drive (e.g., a USB port, a floppy, CD-ROM, or DVD-ROM drive, etc.) to allow a user to input data stored on a portable media device, a microphone, a speaker system, an image capture device (e.g. camera), or any other suitable type of interface device.

Interface 427 may include one or more components configured to transmit and receive data via a communication network, such as the Internet, Ethernet, a local area network, a wide-area network, a workstation peer-to-peer network, a direct link network, a wireless network, or any other suitable communication platform. For example, interface 427 may include one or more modulators, demodulators, multiplexers, demultiplexers, network communication devices, wireless devices, antennas, modems, and any other type of device configured to enable data communication via a communication network.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. An industrial control system comprising:

a controller configured to control a plurality of devices in the industrial control system;

a first device configured to control a first set of one or more of the plurality of devices, the first set associated with a first process in the industrial control system;

a second device configured to control a second set of one or more of the plurality of devices, the second set associated with a second process in the industrial control system;

a first communications network communicatively coupling the controller to the first device, the first communications network carrying first communications in a first communication protocol between the controller and the first device, the first communications pertaining to control of the first device and the first set of devices to effect control of the first process, and further pertaining to control of the second device and the second set of devices to effect control of the second process using a second communication protocol different from the first communication protocol; and a second communications network communicatively coupling the first device to the second device, the second communications network carrying second communications in the second communication protocol between the first device and the second device, the second communications pertaining to control of the second set of devices to effect control of the second process;

wherein the first device (i) receives the first communications from the controller over the first communications network, (ii) controls the first set of devices according to a first portion of the first communications pertaining to control of the first device and the first set of devices, (iii) translates a second portion of the first communications pertaining to control of the second device and the second set of devices from the first communication protocol to the second communication protocol, and (iv) transmits the second portion of the first communications to the second device via the second communications network using the second communication protocol to cause the second device to control the second set of devices.

2. The industrial control system of claim 1, wherein the second device transmits information to the first device using the second communication protocol and the first device translates the information from the second communication protocol to the first communication protocol and transmits the information to the controller over the first communications network using the first communication protocol.

3. The industrial control system of claim 1, wherein the first communication protocol comprises ProfiNet.

4. The industrial control system of claim 3, wherein the first device comprises a ProfiNet device.

5. The industrial control system of claim 1, wherein the controller comprises a ProfiNet controller.

6. The industrial control system of claim 1, wherein the second communication protocol comprises Modbus.

7. The industrial control system of claim 6, wherein the second device comprises a Modbus device.

8. The industrial control system of claim 7, wherein the second device comprises one of a Modbus RTU, a Modbus gateway, or a Modbus flow meter.

9. The industrial control system of claim 1, wherein the first communications network and the second communications network comprise industrial Ethernet networks.

10. The industrial control system of claim 1 further comprising a configuration tool, wherein the configuration tool is used to configure the controller for communication with the first device and the second device and is used to configure the first device for translation of communications between the controller and the second device.

11. A method of controlling an industrial control system having two communications protocols, the method comprising:

sending, by a controller configured to control a plurality of devices in the industrial control system, first communications over a first communications network to a first device, the first device configured to control a first set of one or more of the plurality of devices, the first set associated with a first process in the industrial control system, the first communications network communicatively coupling the controller to the first device, and carrying the first communications in a first communication protocol between the controller and the first device, the first communications pertaining to control of the first device and the first set of devices to effect control of the first process, and further pertaining to control of a second device and a second set of devices associated with a second process in the industrial control system to effect control of a second process using a second communication protocol different from the first communication protocol;

receiving, by the first device, the first communications from the controller over the first communications network;

controlling, by the first device, the first set of devices according to a first portion of the first communications pertaining to control of the first device and the first set of devices;

translating, by the first device, a second portion of the first communications pertaining to control of the second device and the second set of devices from the first communication protocol to the second communication protocol, the second communication protocol implemented on a second communications network communicatively coupling the first device to the second device configured to control the second set of devices; and transmitting, by the first device, from the first device to the second device, as second communications, the second portion of the first communications, via the second communications network using the second communication protocol to cause the second device to control the second set of devices.

12. The method of claim 11, further comprising the second device transmitting information to the first device using the second communication protocol and the first device translating the information into the first communication protocol and transmitting the information to the controller over the first communications network using the first communication protocol.

13. The method of claim 11, wherein the first communication protocol comprises ProfiNet.

14. The method of claim 13, wherein the first device comprises a ProfiNet device.

15. The method of claim 11, wherein the controller comprises a ProfiNet controller.

16. The method of claim 11, wherein the second communication protocol comprises Modbus.

17. The method of claim 16, wherein the second device comprises a Modbus device.

18. The method of claim 17, wherein the second device comprises one of a Modbus RTU, a Modbus gateway, or a Modbus flow meter.

19. The method of claim 11, wherein the first communications network and the second communications network comprise industrial Ethernet networks.

20. The method of claim 11 further comprising configuring, using a configuration tool, the controller for communication with the first device and the second device and configuring the first device for translation of communications between the controller and the second device.

* * * * *